Oct. 22, 1963   E. R. WOODWARD   3,107,583
BRAKE-RELEASE MECHANISM
Filed June 22, 1961
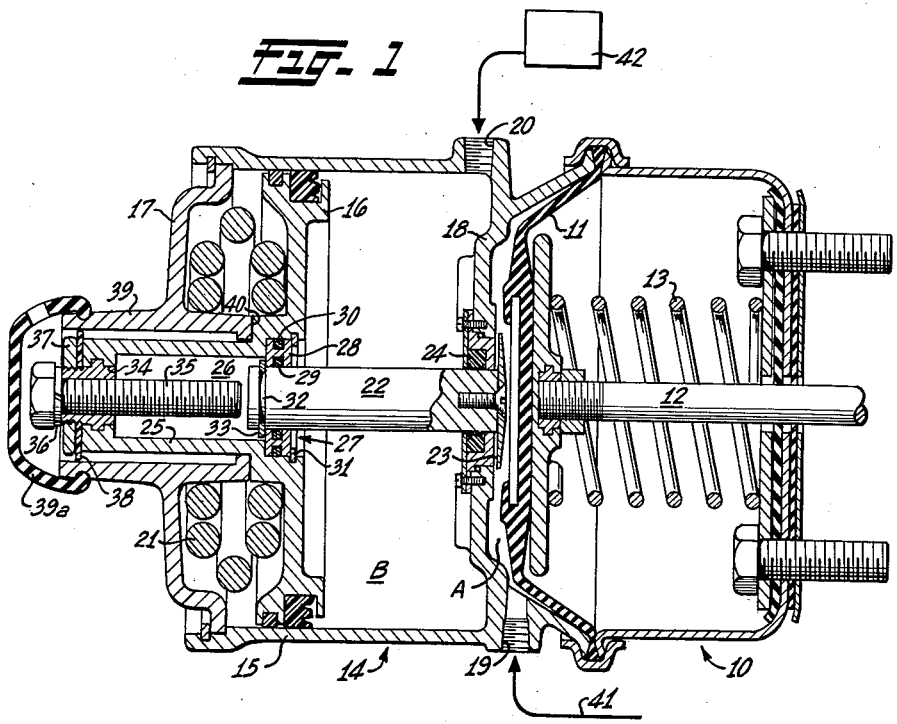
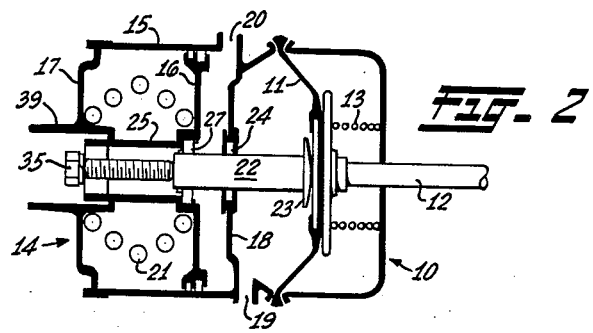
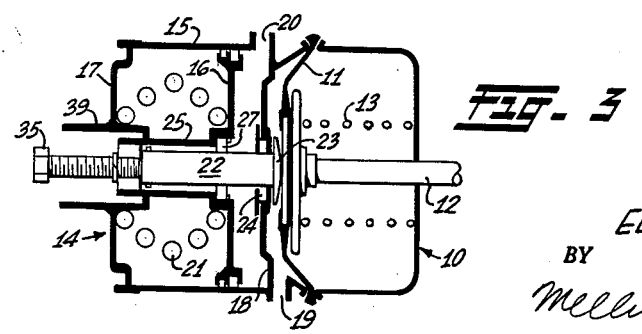
INVENTOR:
ELMER R. WOODWARD
BY
Mellin and Hanscom
ATTORNEYS United States Patent Office 3,107,583
Patented Oct. 22, 1963

3,107,583
BRAKE-RELEASE MECHANISM
Elmer R. Woodward, Cloverdale, Calif., assignor to MGM Brakes, Inc., Cloverdale, Calif., a corporation of California
Filed June 22, 1961, Ser. No. 118,841
15 Claims. (Cl. 92—63)

This invention relates to vehicle-braking apparatus and more particularly involves an attachment including apparatus for effectuating a release of conventional braking systems.

Modern-day trucks and other heavy-duty vehicles are normally equipped with pneumatic braking systems having service brakes which are operated off a main pressure source; and inasmuch as a failure in the main pressure source inhibits the normal operation of those braking systems, it is now conventional that an auxiliary brake-operating means be provided which will automatically apply the service brakes in event of a loss of pressure. One common form of auxiliary brake-operated means provides a spring-loaded diaphragm which is held in compression by the main pressure source. Upon a loss of pressure the compressed spring releases the stored energy, applying the service brake and immobilizing the vehicle until the pressure source is re-established. A braking system of this kind is shown and described in United States Patent No. 2,854,954.

Since auxiliary braking systems, as above described, insure that a vehicle cannot be moved unless there is ample air pressure for operating the conventional braking mechanism, they are of considerable importance to safety on the highways. However, in certain instances, it may be impossible to repair the cause of the loss in air pressure at the point of failure, and for this reason it would be necessary to release the service brakes by other means, so as to permit the vehicle to be towed. Under these circumstances the braking mechanism is ordinarily disconnected.

One object of the present invention is to provide braking apparatus essentially of the kind already known to the art, but being of an improved form and construction, allowing the brakes to be more simply released than by requiring a disconnection of parts.

In brief, this invention comprises an expansible chamber device including a diaphragm and a compressed spring for actuating a brake-operating push rod, and the improvement wherein the push rod may be exteriorly released from the diaphragm, allowing the brake to be released although the spring and its diaphragm are in brake-applying positions. Furthermore, it is contemplated that various forms of apparatus hereinafter shown and described may be produced as an attachment and used conjunctively with the ordinary braking pots of many vehicles, thus enhancing the economical substitution and replacement of parts.

Various objects of this invention will become apparent in view of the drawings and the following detailed description.

In the drawings forming a part of this application and in which like parts are identified by like reference numerals throughout the same, FIG. 1 is a longitudinal center section of a preferred embodiment of braking apparatus constructed in accordance with the teaching of this invention;

FIG. 2 is a simplified longitudinal center section of the apparatus shown in FIG. 1, but illustrating the position of parts when operated by the compression spring to a brake-applying condition; and FIG. 3 is a simplified longitudinal center section of the apparatus of FIGS. 1 and 2, illustrating the positions of parts with a compression spring operated to a brake-applying condition, but allowing the brake-actuating push rod to be moved to a brake-releasing condition.

Referring to FIG. 1 in particular, there is illustrated a pneumatic braking pot 10 of conventional construction defining an expansible chamber A and having a movable wall or diaphragm 11 mounted to a brake-operating rod 12, said rod being connected to a conventional service-brake mechanism (not shown). As is customary, a coil return spring 13 disposed within the pot urges diaphragm 11 toward a brake-releasing position.

An auxiliary brake-operating device, indicated generally by reference numeral 14, defines an expansible chamber B comprising a housing 15 having a movable wall or piston 16. Housing 15 includes a cover plate 17 and an end wall 18 that is in common with pot 10, and threaded conduit means 19 and 20 are provided for transmitting fluid pressure into the pressure chambers of pots 10 and 14, respectively. It will be noted that a compression spring 21 is disposed between piston 16 and cover plate 17 for urging piston 16 in a brake-applying direction, which in turn moves a push rod 22, having a relatively flat bumper end 23, into contact with diaphragm 11. The common end wall 18 is a barrier between the expansible chambers of pots 10 and 14 and defines an opening that receives push rod 22. A sealing means 24 is disposed intermediate push rod 22 and the opening for pressure sealing each expansible chamber from the other.

The general arrangement of parts thus far indicated and described, and the manner in which they are operated, is substantially the same as the structure and operation shown and described in United States Patent No. 2,854,954.

This invention is more especially directed to the improved construction of auxiliary pot 14 wherein push rod 22 is adjustably mounted to piston 16 and is adjustable from without the sealed expansible chamber B. Piston 16 includes a central sleeve portion 25 having an inner recess 26 for receiving push rod 22. A sealing means 27 disposed within sleeve portion 25 receives the push rod in a sliding fit allowing reciprocal movement of said rod relative to piston 16. Sealing means 27 comprises an internally and externally-grooved ring 28 fitted with O-rings 29 and 30 and having a retainer clip 31 for securing the sealing means to piston 16. It will be noted that push rod 22 is formed with a groove 32 and having a retainer clip 33 for limiting the relative free slidable movement of the rod in the direction of diaphragm 11. Accordingly, when spring 21 is compressed by fluid pressure within chamber B, push rod 22 is positively moved into the position shown in FIG. 1, thereby allowing the brake rod 12 to be controlled by the pressure within chamber A and the relatively-weak return spring 13.

An internally threaded steel bushing 34 is cast within sleeve portion 25, and a threaded bolt member 35 is retractably mated therewith, as shown in FIG. 1. Also, a lock washer 36, a flat washer 37, and a flat nylon disc 38 are disposed between the end of sleeve 25 and the hexagonal head of bolt 35.

It will be seen from the drawings that cover plate 17 includes an open sleeve portion 39 that is coaxial with piston sleeve 25. The inner end of sleeve portion 39 provides a stop surface 40 which limits the movement of piston 16 in a brake-releasing direction; and the outer end of sleeve portion 39 being open, permits manual access to the hexagonal bolt head. However, a removable breather cap 39a may be utilized to prevent dirt from entering the open end of sleeve 39 and clogging the release of bolt member 35.

In operation, thread-conducting means 19 and 20 are connected to a valve-controlled pressure line 41 and to the primary pressure source 42, respectively. Assuming that this pressure source is sufficient for normal brake operation, but also assuming that pressure line 41 is selectively vented to a brake-releasing condition, then the brake-actuating mechanism will assume relative positions, as shown in FIG. 1. Obviously, the pressure within pressure source 42 is transmitted into chamber B, causing the piston 16 to be moved against spring 21 until engaged with stop surface 40. Since relatively little or no pressure is passed into chamber A, the return spring 13 moves rod 12 to a brake-releasing position. It will also be apparent that the brakes may be actuated by applying pressure through line 41 into chamber A.

If we now assume a condition of pressure failure in the main pressure source, the position of the braking apparatus would be changed to the condition shown in FIG. 2. Spring 21 would drive piston 16 toward the right into a brake-applying position and as the piston is moved, the end of bolt 35 would engage push rod 22 and move it against diaphragm 11. The nylon disc 38 would serve to keep piston 16 centered relative to sleeve portion 39 and would prevent abrasive surface contact between washer 38 and the interior surface of said sleeve portion.

Assuming that the cause of pressure failure cannot be immediately corrected and that the vehicle must be moved, the brakes may be released by retracting thread bolt 35, allowing spring 13 to move push rod 22 axially through piston 16, thereby effecting a release of the service brake. The position of parts, when fully released, would be substantially as shown in FIG. 3.

It is to be understood that the form of the invention herewith shown and described is to be taken as a preferred example thereof and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. In combination, a brake-actuating mechanism comprising: a first expansible chamber device including a housing having a first movable wall, a brake-actuating rod operably associated with said wall and adapted to be moved thereby in a braking direction, means for transmitting fluid pressure into said first expansible chamber device moving said wall in a braking direction, means resiliently opposing movement of said rod in a braking direction and biasing said rod into a brake-releasing position; auxiliary brake-operating means comprising a second expansible chamber device including a housing and a second movable wall, means including a push rod adjustably mounted to said second movable wall for transmitting braking movement to said brake-actuating rod, means accessible from without said second expansible chamber device for axially adjusting said push rod relative to said second movable wall, means resiliently urging said second movable wall in a braking direction, and means for transmitting fluid pressure into said second expansible chamber device and moving said second wall in a brake-releasing direction.

2. The apparatus of claim 1 wherein said first and second expansible chamber devices have a common wall with an opening therein, said push rod extending through said opening and being reciprocally movable into engagement with said first movable wall, and further including sealing means intermediate said push rod and opening for pressure sealing each of said first and second expansible chamber devices.

3. The apparatus of claim 1 wherein said push rod is slidably mounted to said second movable wall in substantially the same direction as said wall is adapted to be moved for imparting movement to said rod, and further including stop means adjustably mounted to and extending through said second movable wall, said stop means being axially adjustable relative to said push rod for limiting movement of said rod in a brake-releasing direction.

4. The apparatus of claim 1 wherein said second movable wall is formed with a recess extending axially of said push rod and in a brake-releasing direction, said push rod being mounted to said second wall for limited reciprocal movement in said recess, and further including stop means adjustably mounted to and extending through the recess of said second movable wall, said stop means being axially adjustable relative to said push rod for limiting movement of said push rod relative to said second wall in a brake-releasing direction.

5. An auxiliary brake-actuating attachment for a conventional brake pot having a movable diaphragm for actuating a brake lever, said attachment comprising: an expansible chamber device including a housing having a movable wall therein, means including a push rod adjustably mounted to said movable wall and adapted for being moved into engagement with the movable diaphragm of a brake pot for applying a service brake, means accessible from without said expansible chamber device for axially adjusting said push rod relative to said movable wall, means resiliently urging said movable wall in a brake-applying direction, and means for transmitting fluid pressure into said pressure chamber to move said wall in a brake-releasing direction.

6. The apparatus of claim 5 wherein said movable wall is formed with a recess extending axially of said push rod and in a brake-releasing direction, said push rod being mounted to said movable wall for limited reciprocal movement in said recess, and further including means reciprocally operable from without said pressure chamber device and extending through said recess for engaging said push rod and limiting its movement relative to said movable wall in a brake-releasing direction.

7. The apparatus of claim 6 wherein said movable wall comprises a piston having a central sleeve portion defining said recess, and further including sealing means disposed within said sleeve portion for receiving said push rod therethrough and allowing reciprocal movement of said rod relative to said piston, and wherein said push-rod-engaging means comprises a threaded member axially projected through said sleeve portion.

8. The apparatus of claim 6 wherein said means resiliently urging said movable wall in a brake-applying direction comprises a helical spring disposed between said movable wall and a cover plate, said cover plate being secured to said housing and providing a stop surface for limiting movement of said wall in a brake-releasing direction.

9. The apparatus of claim 8 wherein said movable wall and cover plate have coaxial inner and outer sleeve portions, respectively, said outer sleeve portion of said cover plate defining an inner guiding surface for the outer surface of said inner sleeve portion of said movable wall.

10. The apparatus of claim 9 and further including sealing means disposed within said inner sleeve portion for receiving said push rod therethrough and allowing reciprocal movement of said rod relative to said wall, and wherein said push-rod-engaging means comprises a threaded member secured to an inner threaded surface of said inner sleeve portion of said movable wall and extending axially toward said push rod, said threaded member being accessible through said outer sleeve portion of said cover plate.

11. A brake-actuating attachment for a conventional brake-operating pot having a movable diaphragm for actuating a brake lever, said attachment comprising: an expansible pressure chamber device including a housing having an opening at one end and a movable wall at an opposite end, means including a push rod adjustably mounted to said movable wall, said push rod extending through the opening of said housing and adapted for axial movement into engagement with the movable diaphragm of a pot for applying a service brake, means accessible from without said expansible chamber device for axially adjusting said push rod relative to said movable wall, sealing means intermediate said push rod and opening for pressure sealing said device, means resiliently urging said movable wall in a brake-applying direction, and means for transmitting fluid pressure into said pressure chamber to move said wall in a brake-releasing direction.

12. A brake-actuating attachment for a conventional brake-operating pot having a movable diaphragm for actuating a brake lever, said attachment comprising: means defining an expansible pressure chamber including a housing having a movable wall, resilient means urging said movable wall in a brake-applying direction, means for transmitting fluid pressure into said pressure chamber to move said wall against the said resilient means and in a brake-releasing direction, a push rod extending into and from said pressure chamber for moving the movable diaphragm of a conventional brake-operating pot, and means retractibly mounted to said movable wall and engageable with said push rod upon normal brake-applying movement of said movable wall for moving said push rod in response thereto, said retractible means being accessible from without said pressure chamber and being retractible relative to said movable wall into a position that allows said push rod to assume a brake-releasing position.

13. The apparatus of claim 12 wherein said retractible means comprises a member threaded through said movable wall in a direction substantially normal to said wall and parallel to the direction of its movement.

14. The apparatus of claim 13 wherein said push rod is reciprocally mounted to said movable wall and adapted to be engaged by said threaded member, and further including a sealing means between said push rod and movable wall for pressure sealing said expansible pressure chamber.

15. The apparatus of claim 13 wherein said movable wall includes a central sleeve portion defining a recess, and further including a sealing means disposed within said sleeve portion for receiving said push rod in a slidable engagement and allowing reciprocal movement of said rod relative to said piston, and wherein said threaded member projects axially through said sleeve portion for engagement with said push rod.

References Cited in the file of this patent
UNITED STATES PATENTS
2,854,954    Howze  ---------------- Oct. 7, 1958